United States Patent

Patel et al.

[11] Patent Number: 5,821,006
[45] Date of Patent: Oct. 13, 1998

[54] HYBRID CELL/CAPACITOR ASSEMBLY FOR USE IN A BATTERY PACK

[75] Inventors: Hitendra Patel, Palatine; Kirk S. Watson, Chicago, both of Ill.

[73] Assignee: Motorola, Inc., Schaumburg, Ill.

[21] Appl. No.: 888,390

[22] Filed: Jul. 7, 1997

[51] Int. Cl.⁶ ................................................. H01M 16/00
[52] U.S. Cl. ...................................................... 429/3; 429/7
[58] Field of Search .............................. 429/7, 9, 3, 127; 361/434

[56] References Cited

U.S. PATENT DOCUMENTS 5,472,804  12/1995  Austin et al. ........................ 429/7 X
5,587,250  12/1996  Thomas et al. ........................ 429/3
5,670,266  9/1997   Thomas et al. ........................ 429/3
5,738,919  4/1998   Thomas et al. ........................ 429/3

*Primary Examiner*—Anthony Skapars
*Attorney, Agent, or Firm*—Felipe J. Farley

[57] ABSTRACT

A hybrid cell/capacitor assembly (300) includes a battery cell (100) and a capacitor (200) formed into a thin rectangular sheet and having two leads (205, 210) extending therefrom. The capacitor (200) is wrapped around the battery cell (100) to form the hybrid cell/capacitor assembly (300). The leads (205, 210) of the capacitor (200) can be attached to terminals (105, 100) of the battery cell (100) or to terminals of one or more other cells within a battery pack (600).

21 Claims, 2 Drawing Sheets

HYBRID CELL/CAPACITOR ASSEMBLY FOR USE IN A BATTERY PACK

TECHNICAL FIELD

This invention relates in general to energy storage devices, and more specifically to hybrid rechargeable energy storage devices which provide high power and high capacity for portable electronic devices.

BACKGROUND

Consumer markets continue to request smaller, lighter portable electronic devices which need smaller energy sources, such as batteries, to power the devices. Very small energy storage devices can be fabricated, but such compactness comes at the cost of energy capacity, rendering such small batteries unsuitable for high power applications, since, as the battery is discharged, it becomes unable to provide current at a required level. Therefore, even though the battery may retain a substantial charge, it is useless to the electronic device to which it is attached.

One way that this problem has been addressed is to provide another energy storage device, such as an electrochemical capacitor, in parallel with the battery to provide bursts of high power as needed. The problem with this arrangement, however, is that space within a smaller, lightweight battery is at a premium, leaving little or no room for additional components, such as electrochemical capacitors.

Thus, what is needed is a space-saving way to place a capacitor within a battery pack.

DETAILED DESCRIPTION OF THE PREFERRED EMBODIMENT

Figure 2:
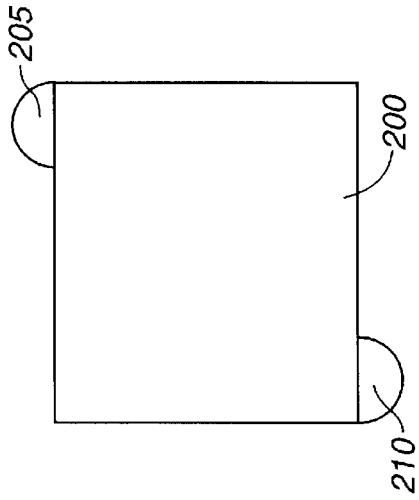
FIG. 2 is a top view of a thin, relatively flat electrochemical capacitor in accordance with the present invention.

While the specification concludes with claims defining the features of the invention that are regarded as novel, it is believed that the invention will be better understood from a consideration of the following description in conjunction with the drawing figures, in which like reference numerals are carried forward.

Figure 1:
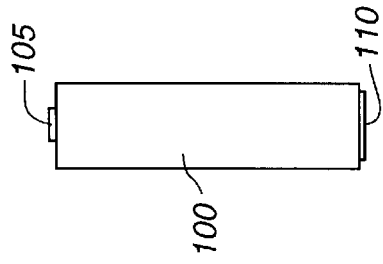
FIG. 1 is a side view of a conventional cylindrical battery cell.

FIG. 1 shows a conventional battery cell 100, such as a standard AA primary or secondary cell, including a positive terminal 105 and a negative terminal 110. Such cells are frequently used to form cell arrangements that are included within primary or secondary energy storage devices, e.g., battery packs, for powering portable electronic devices, such as cellular telephones, two-way radios, or pagers. However, conventional cell arrangements become unable to provide current at a required level once discharged. This becomes even more of a problem when the device to which the battery is attached requires high power current pulses in an operating cycle which otherwise requires a much lower operating current because, during such a power pulse, the voltage of the cell arrangement can drop below that needed to continue powering the portable device. As a result, the portable device can be turned off unexpectedly.

One way to solve this problem is to provide a second energy source, such as an electrochemical capacitor, in parallel with the cell arrangement to deliver a burst of high power as required by a specific application. This type of electrical arrangement is described in U.S. Pat. No. 5,587,250 to Thomas et al., entitled "Hybrid Energy Storage System," which is hereby incorporated by reference.

As noted above, the use of an electrochemical capacitor within the battery pack to provide bursts of high power is desirable from a performance aspect, but space constraints within small, light battery packs often prohibit such an arrangement. As a result, prior art battery packs often are unable to include an electrochemical capacitor or other energy storage device for providing pulsed power.

Referring next to FIG. 2, a planar electrochemical capacitor 200 formed as a thin, rectangular sheet is shown. The electrochemical capacitor 200 preferably includes at least one electrode fabricated of a metal oxide material, such as $RuO_2$. The second electrode can be made from a similar or different metal oxide, or may be of another type of material altogether. In this regard, the second electrode could be a polymer, such as polyanile, polypyrrole, polyurethane, or combinations thereof. The electrolyte is preferably a solid electrolyte that is alkaline or proton conducting.

The capacitor 200 preferably includes a first electrode, a second electrode, and an electrolyte disposed therebetween. It can be fabricated as disclosed in one or more of U.S. patent application Ser. No. 08/415,976, filed Apr. 3, 1995, to Bai et al., entitled "Electrochemical Capacitor and Method of Making Same"; U.S. patent application Ser. No. 08/513,648, filed Aug. 10, 1995, to Bai et al., entitled "Electrochemical Charge Storage Device Having Constant Voltage Discharge", now U.S. Pat. No. 5,518,838; U.S. Pat. No. 5,518,838 to Bai et al., entitled "Electrochemical Cell Having Solid Polymer Electrolyte and Asymmetrical Inorganic Electrodes"; U.S. patent application Ser. No. 08/340,957, filed Nov. 17, 1994, to Howard et al., entitled "Polymer Gel Electrolyte and Electrochemical Capacitor Device Using Same", now abandoned; U.S. patent application Ser. No. 08/505,427, filed Jul. 21, 1995, to Howard, entitled "Conducting Polymer Electrodes for Energy Storage Devices and Method of Making Same", now abandoned; U.S. Pat. No. 5,510,046 to Li et al., entitled "Modified Electrolyte for Electrochemical Cells"; U.S. patent application Ser. No. 08/498,450, filed Jul. 5, 1995, to Li et al., entitled "Polymer Electrodes for Energy Storage Devices and Method of Making Same", now U.S. Pat. No. 5,751,541; U.S. Pat. No. 5,563,765 to Lian et al., entitled "Amorphous Cobalt Alloy Electrodes for Aqueous Electrochemical Devices"; and U.S. Pat. No. 5,429,895 to Lian et al., entitled "Nickel Alloy Electrodes for Electrochemical Devices", the disclosures of which are incorporated herein by reference.

According to the present invention, the capacitor 200 includes leads 205, 210 extending therefrom for coupling to negative and positive terminals, respectively, of a cell arrangement. The capacitor 200 is preferably in a form factor that permits wrapping around one or more cells of the cell arrangement. By way of example, the capacitor 200 can be a flat, flexible, three-cell capacitor that is 4.5 centimeters (cm) in length and 4.0 cm in width so that it wraps conveniently around a standard cell, such as conventional AA cell 100 (FIG. 1). The leads 205, 210 can be formed into any shape, but are shown in a semicircular form factor that can easily be folded over a cylindrical battery cell.

Figure 3:
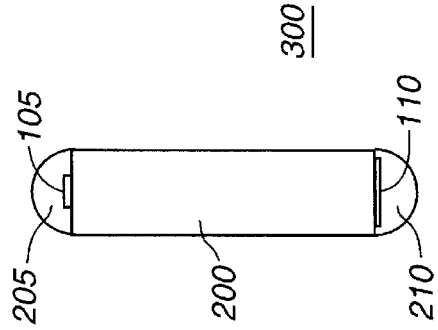
FIG. 3 is a side view of a hybrid assembly formed by wrapping the battery cell of FIG. 1 with the electrochemical capacitor of FIG. 2 in accordance with the present invention.

Referring to FIG. 3, a hybrid assembly 300 comprising the flat capacitor 200 wrapped around the cell 100 is depicted. As shown, the leads 205, 210 extend from the capacitor 200 that has been wrapped around the cell 100. When the cell arrangement includes only a single cell 100, the lead 205 of the wrapped capacitor 200 can be bent to contact the positive terminal 105, then electrically coupled thereto, such as by welding, riveting, or soldering. The lead 210 is similarly electrically coupled to the negative terminal 110.

Figure 4:
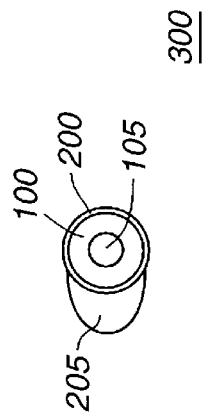
FIG. 4 is a top view of the hybrid assembly of FIG. 3 in accordance with the present invention.

FIG. 4 is a top view of the hybrid assembly 300 in which the capacitor leads 205, 210 can be coupled to the cell terminals 105, 110 if desired. As shown, the capacitor 200 takes up very little space since it has been wrapped around a cell 100 included in a battery pack. As space constraints within the battery pack vary, the diameter of the hybrid assembly 300 can be advantageously varied by increasing or decreasing the number of cells included within the capacitor 200 or by wrapping additional capacitors 200 around other cells (not shown) within the battery pack. The electrical configurations of such arrangements will, of course, be determined by the performance specifications of the battery pack. When, for instance, the thickness of any hybrid assemblies 300 must be minimized but a greater voltage is required, a thinner, one-cell capacitor could be wrapped around each cell of the battery pack, then the one-cell capacitors could be electrically connected in series rather than connecting each wrapped capacitor to the cell with which it is associated.

EXAMPLE

A flat, flexible, three-cell capacitor was fabricated to fit the form factor of a standard AA cell. Specifically, the capacitor was 4.5 cm long and 4.5 cm wide and was wrapped around the AA cell with leads exposed to make contact with the terminals of the cell. The capacitor was rolled around the cell while the electrolyte was wet because the capacitor was most flexible at this time.

Initially, the leakage current of the capacitor was 50 milliamps (mA). Once the capacitor was tightly rolled around the cell, the leakage current dropped to 2.5 mA. This phenomena was noted three times in three repeated experiments, in which the leakage current of the rolled capacitor decreased by an order of magnitude each time. The capacitance did not increase or decrease, nor was the series resistance (ESR) affected. After three months of testing, the capacitor retained its previously tested current and ESR ratings.

It can be seen that the use of the hybrid assemblies 300 according to the present invention improves battery performance by delivering power pulses that cells alone could not provide. At the same time, little additional space is required. Even this minimal amount of additional space could be eliminated by modifying a battery cell so that the wrapped capacitor is used as the battery label or the battery can, thereby substituting the capacitor for a component that would otherwise itself require space accommodations within a battery pack.

Figure 5:
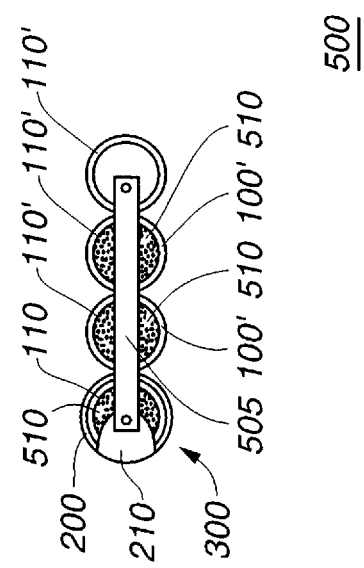
FIG. 5 is a bottom view of a battery cell arrangement including the hybrid assembly of FIG. 3 in accordance with the present invention.

FIG. 5 shows a battery cell arrangement 500 including a hybrid assembly 300 as well as other battery cells 100'. Since the capacitor 200 is preferably electrically coupled in parallel to the entire cell arrangement 500, one of the leads 205 (not shown in FIG. 5) is coupled to the positive terminal of the first cell in series, which may be the cell around which it is wrapped, while the other lead 210 is electrically coupled to the negative terminal 110' of the last cell 100' in series. This can be done, for instance, by insulating the negative terminal 110 of the cell around which the capacitor 200 is rolled, such as by placing an insulator 510 thereover, and welding or soldering a tab 505 from the lead 210 to the negative terminal 110' of the last cell 100' in series. The negative terminals 110' of each cell 100' over which the tab 500 is disposed should also be insulated to prevent inadvertently shorting the cell arrangement 500.

Figure 6:
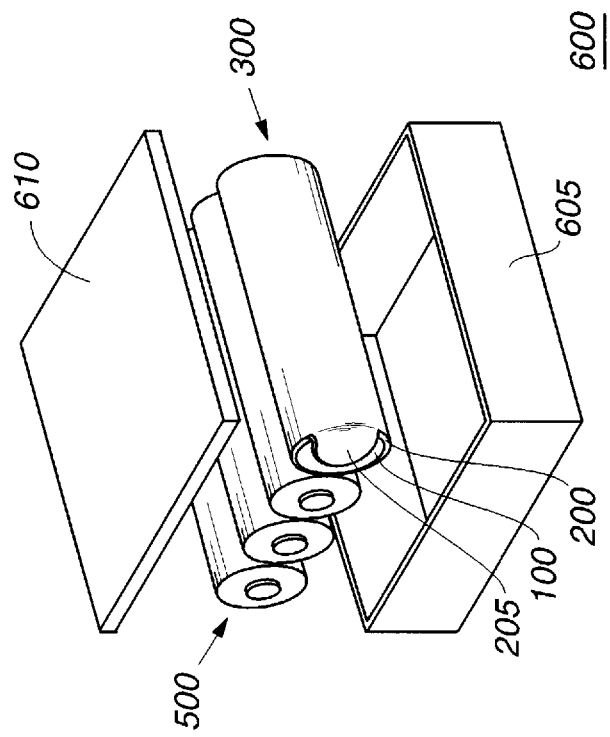
FIG. 6 is a perspective exploded view of a battery pack including the battery cell arrangement of FIG. 5 in accordance with the present invention.

FIG. 6 is an exploded view of a battery pack 600 including the cell arrangement 500, of which the hybrid assembly 300 is a part. Once the cells included in the cell arrangement 500 have been electrically coupled to each other and to any wrapped capacitors 200 in the desired configuration, the cell arrangement 500 is positioned within a housing 605. A cover 610 encloses the cell arrangement 500 within the housing 605, and the housing 605 and cover 610 are held together by a sealing method such as ultrasonic welding or through the use of mechanical latches. It will be appreciated that additional circuitry (not shown), such as safety circuits, charger interfaces, thermistors, and coding devices, can also be included within the battery pack 600.

In summary, the battery pack as described above includes one or more battery cells for powering a portable device to which the battery pack is coupled. The battery pack further includes at least one integral capacitor that is wrapped around a battery cell to form a hybrid cell/capacitor assembly that consumes little additional space within the battery pack. The capacitor is preferably electrically coupled to the cell arrangement in parallel to provide short bursts of power needed by the portable device.

The hybrid assembly according to the present invention improves battery performance without significantly increasing the required space. When space constraints are particularly tight, the amount of needed space can be limited even further by using the wrapped capacitor as the cell label or as the cell can, thereby decreasing the size of the hybrid assembly. As a result, the hybrid assembly described above can be used to position a capacitor within a battery pack that does not have room for capacitors that have been fabricated and assembled according to conventional form factors.

It will be appreciated by now that there has been provided a hybrid cell/capacitor assembly that efficiently uses space within a battery pack while improving battery performance.

What is claimed is:

1. A hybrid cell/capacitor assembly, comprising:
   an energy storage device; and
   a capacitor formed into a thin rectangular sheet and having leads extending therefrom,
   wherein the capacitor is wrapped around the energy storage device to form the hybrid cell/capacitor assembly.

2. The hybrid cell/capacitor assembly of claim 1, wherein the energy storage device comprises a battery cell.

3. The hybrid cell/capacitor assembly of claim 2, wherein the capacitor comprises one or more cells electrically connected in series within a thin, flexible form factor.

4. The hybrid cell/capacitor assembly of claim 2, wherein a first of the leads is electrically coupled to a positive terminal of the battery cell and a second of the leads is electrically coupled to a negative terminal of the battery cell.

5. The hybrid cell/capacitor assembly of claim 2, wherein the battery cell is cylindrical in shape, and wherein the leads are semicircular in shape.

6. The hybrid cell/capacitor assembly of claim 2, wherein the capacitor is utilized as a can of the battery cell.

7. The hybrid cell/capacitor assembly of claim 2, wherein the capacitor is utilized as a label of the battery cell.

8. The hybrid cell/capacitor assembly of claim 2, wherein the hybrid cell/capacitor assembly is included within a battery pack for powering a portable electronic device.

9. A battery pack for powering a portable electronic device, the battery pack including:

an energy storage device for providing power; and a capacitor formed into a thin rectangular sheet, having leads extending therefrom, and capable of delivering a burst of high power, wherein the capacitor is wrapped around the energy storage device to form a hybrid cell/capacitor assembly within the battery pack.

10. The battery pack of claim 9, wherein the energy storage device comprises a battery cell.

11. The battery pack of claim 10, wherein the capacitor comprises one or more cells electrically connected in series within a thin, flexible form factor.

12. The battery pack of claim 10, wherein a first of the leads of the capacitor is electrically coupled to a positive terminal of the battery cell and a second of the leads of the capacitor is electrically coupled to a negative terminal of the battery cell.

13. The battery pack of claim 10, wherein the battery cell is cylindrical in shape, and wherein the leads of the capacitor are semicircular in shape.

14. The battery pack of claim 10, wherein the capacitor is utilized as a can of the battery cell.

15. The battery pack of claim 10, wherein the capacitor is utilized as a label of the battery cell.

16. The battery pack of claim 10, further comprising:

other battery cells electrically coupled to the hybrid cell/capacitor assembly; and a housing for enclosing the hybrid cell/capacitor assembly and the other battery cells.

17. A battery pack for powering a portable electronic device, the battery pack comprising:

a battery cell for providing power;

a capacitor formed into a thin rectangular sheet, having leads extending therefrom, and capable of delivering a burst of high power, wherein the capacitor is wrapped around the battery cell to form a hybrid cell/capacitor assembly within the battery pack; and a housing for enclosing the hybrid cell/capacitor assembly.

18. The battery pack of claim 17, wherein the capacitor comprises one or more cells electrically connected in series within a thin, flexible form factor.

19. The battery pack of claim 17, wherein a first of the leads of the capacitor is electrically coupled to a positive terminal of the battery cell and a second of the leads of the capacitor is electrically coupled to a negative terminal of the battery cell.

20. The battery pack of claim 17, wherein the capacitor is utilized as a can of the battery cell.

21. The battery pack of claim 17, wherein the capacitor is utilized as a label of the battery cell.

* * * * *